April 9, 1963   G. C. McNABB   3,084,536
SPLIT FLOW GAS ANALYSIS DETECTOR
Filed Oct. 6, 1960   3 Sheets-Sheet 1
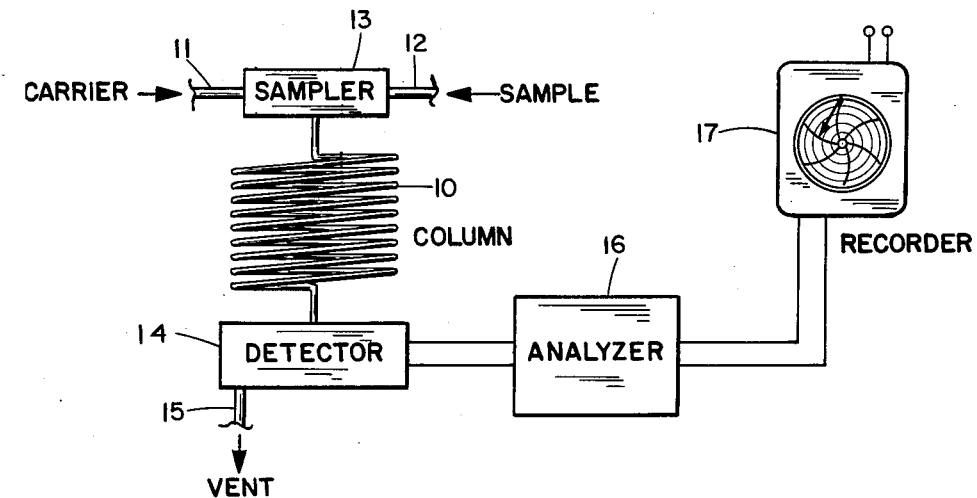
FIG. I
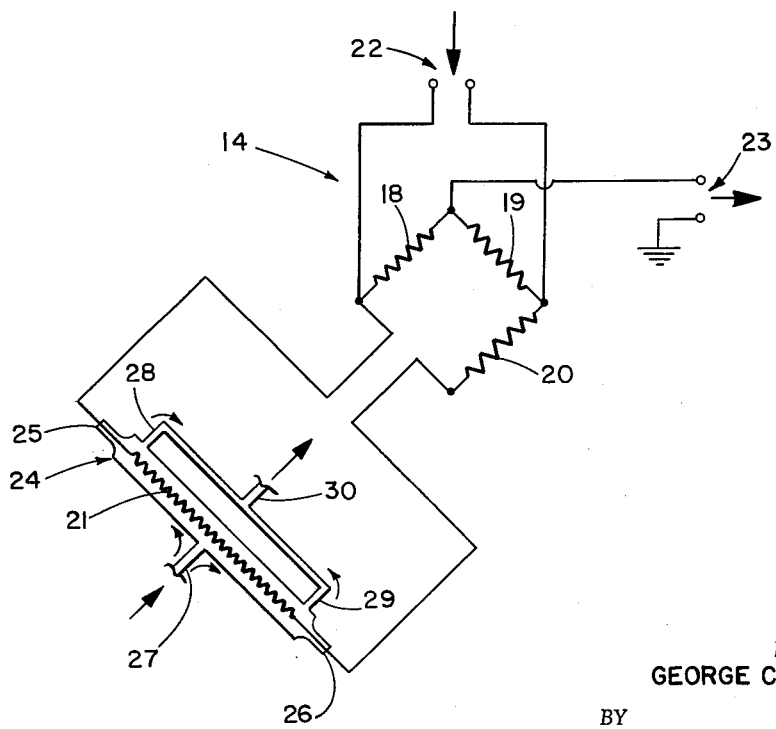
FIG. II
INVENTOR.
GEORGE C. McNABB
BY
Lawrence H. Patton
AGENT

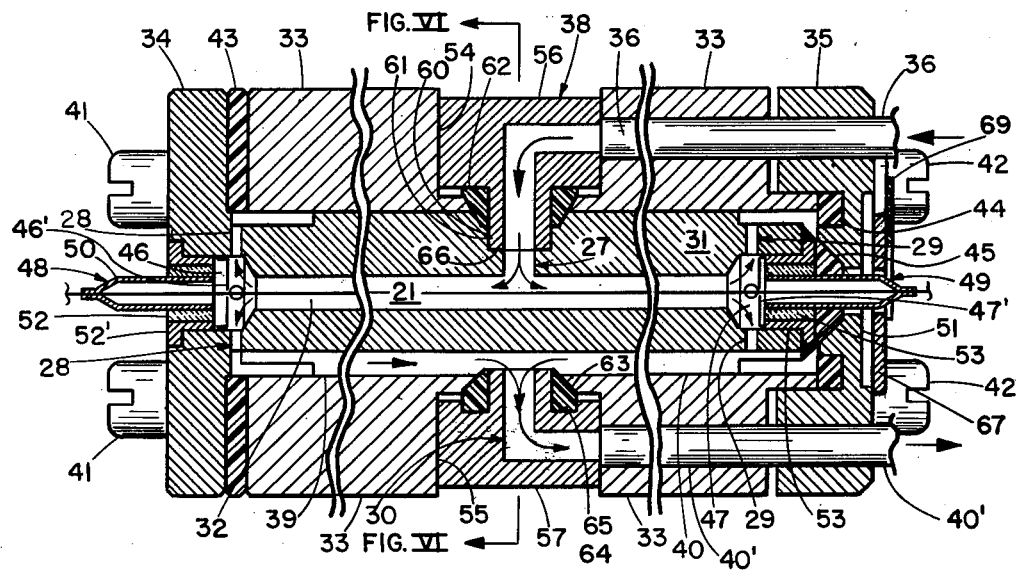
FIG. III
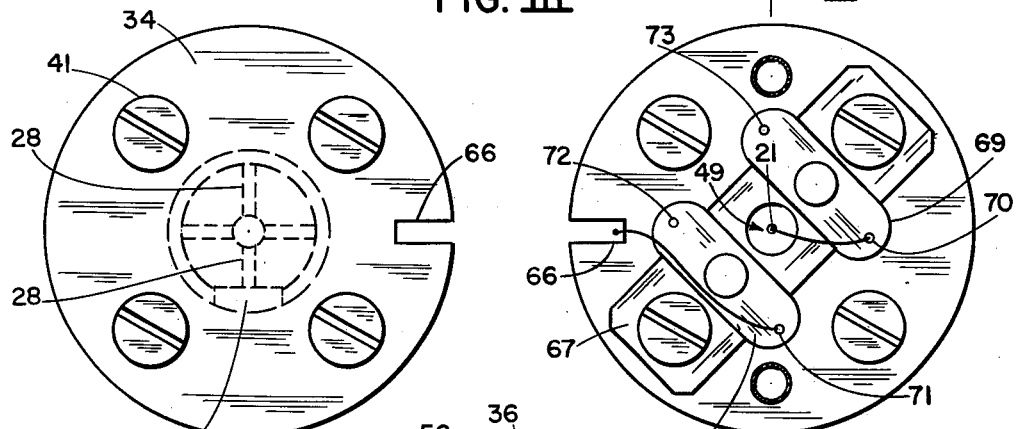
FIG. IV          FIG. V
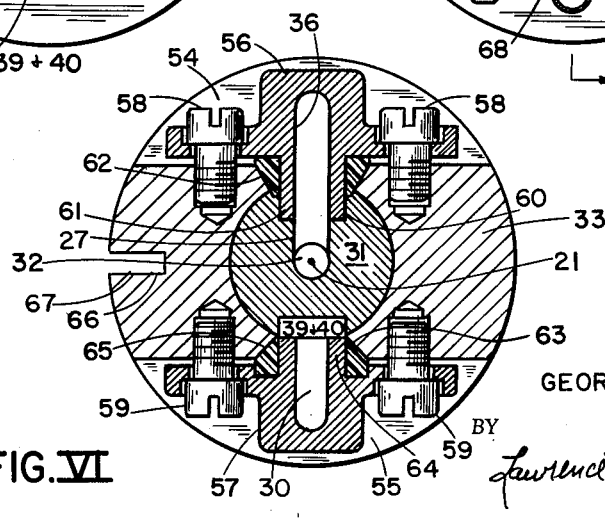
FIG. VI
INVENTOR.
GEORGE C. McNABB
BY
Lawrence H. Patton
AGENT

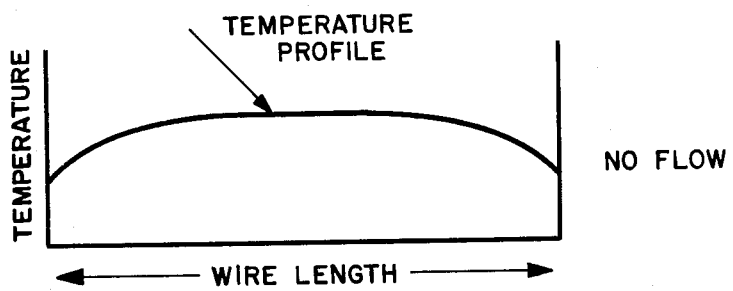
FIG. VII
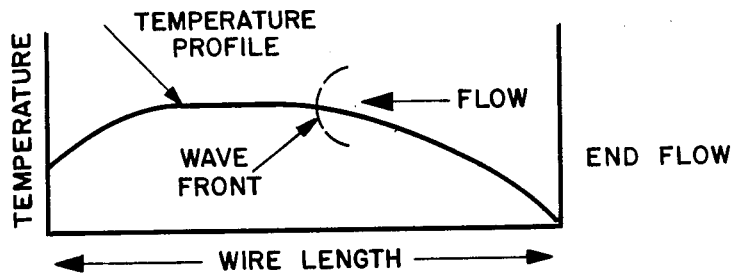
FIG. VIII
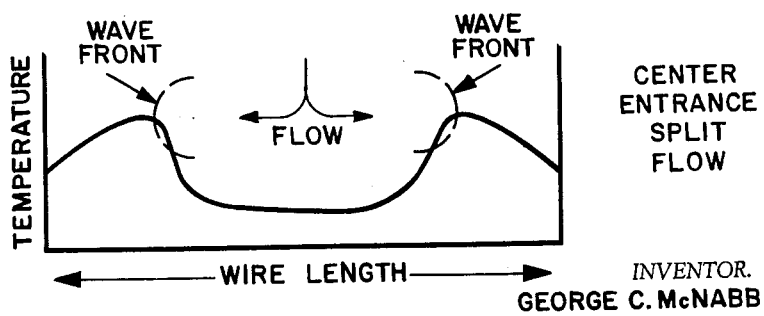
FIG. IX

United States Patent Office 3,084,536
Patented Apr. 9, 1963

3,084,536
SPLIT FLOW GAS ANALYSIS DETECTOR
George C. McNabb, Attleboro, Mass., assignor to The Foxboro Company, Foxboro, Mass., a corporation of Massachusetts
Filed Oct. 6, 1960, Ser. No. 60,987
2 Claims. (Cl. 73—27)

This invention relates to gas analysis detection devices and has particular reference to electrical resistance hot wire forms of such devices.

Hot wire thermal conductivity gas analysis detectors in general comprise housings having electrical resistance wires therein with gas passages through the housings to pass the gas to be detected over the resistance wire. The resistance wire is heated by electrical current in a sensing circuit, and, as the gas is passed over the wire, heat therefrom is conducted away through the gas to the housing at different rates depending upon the thermal conductivity characteristics of the gases. Thus thermal conductivity characteristic is representative of the ability of the particular gas component to carry heat away from the hot wire. This ability is identifiably characteristic of individual components of a gas mixture. Accordingly, for example, in gas chromatography wherein a gas mixture is travelled through a chromatographic column and therein separated into its various components which thereafter emerge from the end of the column separately, the application of such separate components to a hot wire detector is an accepted method of quantitative determination of the values of such components.

Gas chromatography especially as applied to industrial processes is only recently come into general interest as practical procedure. Thus no particular arrangement of hot wire in a housing has been observed except to generally have gas flow over a wire of this nature. In some instances such a flow was not considered desirable and side pockets of gas were provided, with the hot wires in the side pockets.

Now it appears that there are many points of urgency with respect to the design of such a device and for this purpose this invention provides means whereby a small amount of gas can quickly have a determinable effect on the hot wire, whereby diffusion volumes such as side pockets or other areas, not cleanly swept through by a passing gas, are held to a minimum, and whereby the more effective areas of response of a particular length of hot wire are determined and the gas travelled on an operative basis over this portion of wire to the exclusion of other less desirable portions of the wires.

The present invention thus avoids the prior art disadvantages and provides a hot wire thermal conductivity gas analysis detector wherein small volumes of sample gas components are effective, wherein diffusion volumes are kept at a minimum, and wherein the most effective areas of the hot wire are made operational to the exclusion of other portions of the hot wire.

This invention provides these advantages by means of an efficient, compact unit wherein one of the major feature combinations is a hot wire lengthwise in a tube with a gas entrance located lengthwise intermediate of the tube and two gas exits one on each side of the entrance and located between the entrance and the end of the tube. Thus an incoming volume of sample gas is split and the parts thereof simultaneously applied to different portions of a hot wire, thus more quickly and effectively producing the heat conduction reaction necessary to detect the desired factor of the sample gas.

It is therefore an object of this invention to provide a new and improved thermal conductivity gas analysis detector.

Other objects and advantages of this invention will be in part apparent and in part pointed out hereinafter.

In the drawings:

FIGURE I is a schematic illustration of a chromatographic gas analysis system including a detector unit which may be the detector according to this invention;

FIGURE II is an illustration of a detector system according to this invention wherein the hot wire of the detector forms one leg of an electrical resistance bridge;

FIGURE III is a lengthwise central section of a hot wire detector according to this invention;

FIGURE IV is a left end view of structure of FIGURE III as if it were unsectioned;

FIGURE V is a right end view of the structure of FIGURE III as if it were unsectioned;

FIGURE VI is a center section of the structure shown in FIGURE III taken on line VI—VI as if the structure FIGURE III were unsectioned; and FIGURES VII, VIII, and IX are theoretical curve formations illustrating temperature conditions of hot wires with respect to, VII, a situation with no gas flow; VIII, a situation with gas flow from one end of the wire toward the other; and, IX, a situation illustrating the center entrance, split flow effect according to this invention.

By way of illustration, this invention is disclosed herein in connection with a gas analysis chromatographic system as shown schematically in FIGURE I.

The FIGURE I system comprises a chromatographic column 10 into which a combination of carrier and sample mixture gases is introduced through a carrier inlet 11 and a sample inlet 12. The carrier and sample are selectively entered into the column 10 through a sampler unit 13 which may be a conventional valving arrangement for mixing or interjecting a measured body of sample mixture gas into the carrier gas stream.

As the sample gas mixture is travelled through the column 10, its various components are separated from each other due to their individual retention characteristics with respect to the sorbtive surfaces within the column and in chromatographic fashion these separated components emerge from the column and are applied to a detector 14. In the usual situation the detector response on a quantitative basis is to provide representation of the percentage composition of each of the sample components to the whole. The detector 14 is provided with a vent 15 and the detector response, in this case electrical, is applied to an analyzer 16 in any one of several conventional forms. The output of the analyzer is applied as desired. In this instance it is shown as being applied to a standard recorder instrument 17.

The growing use of such systems and the increasing necessity for speed, accuracy, and other improvement factors such as small size components, points up the necessity for the system having the advantages and features provided by the device set forth herein in accordance with this invention.

FIGURE II is a schematic showing of the detector 14 of FIGURE I in simple illustration of a device according to this invention. An electrical bridge is shown having arms 18, 19, 20, and 21. The bridge is energized from a suitable electrical source as indicated at 22, with an output for unbalance representations as indicated at 23. The bridge arm 21 is the hot wire portion of the thermal conductivity detector according to this invention. It is provided with a narrow tubular passage 24, with the hot wire 21 disposed lengthwise therethrough and supported only at its ends by sealed arrangements indicated at 25 and 26. A gas inlet is provided at 27 centrally lengthwise of the passage 24 and a pair of exits 28 and 29 are located on either side of the inlet 27 and are connected to a single common outlet 30. The outlet 30 may, for example, connect with the vent 15 of the detector unit 14 in FIGURE I.

Thus in FIGURE II the effluent from the chromatographic column is entered into the detecting unit through the entrance port 27 and is then split two ways oppositely along the hot wire 21 to respective exit ports 28 and 29 and then is exited through a common exit 30. Thus a feature of importance is illustrated in this schematic showing in that the entrance port is lengthwise intermedite of the detector passage and two exit ports are provided such that the gas is divided and travelled along two different portions of the hot wire simultaneously.

The FIGURE III showing of a thermal conductivity detector unit according to this invention is referred to FIGURE II by indicating the hot wire as at 21, the central inlet gas port at 27, the exit ports at 28 and 29 and finally the terminal exit common to both 28 and 29 as at 30.

The structure of FIGURE III comprises a lengthwise central cylindrical body 31 wherein there is a lengthwise opening 32 as the main gas passage arrangement of the device and which contains the hot wire 21 disposed lengthwise therein, end mounted and coaxially located with respect to the cylindrical opening 32 and the cylindrical body 31. The body 31 is formed of thermally conductive metal and as the gas is travelled through the passage arrangement 32, heat is conducted from the hot wire 21 to the body 31 and dispersed therefrom. The central cylindrical body 31 is incased in a housing sleeve 33 and end caps 34 and 35 are provided at each end of the device as overall covers for both the central cylindrical body 31 and the housing sleeve 33.

The gas entrance port 27 opens into the lengthwise midpoint of the gas passage 32 and gas is led into the entrance port 27 through an inlet pipe 36 which runs, as seen in the drawing, from the right hand end of the device lengthwise through the housing sleeve 33 to the central portion thereof and then is angled inwardly to the inlet port 27 through a coupling assembly 38. The pipe 36 and the port 27 in the inlet arrangement for gases in this device have essentially the same diameter as the passage 32 within the main body 31 of the device. The outlet passages 28 and 29 are similar and both formed like the passages 28 as indicated in the end view of FIGURE IV, and formed, like spokes of a wheel, of relatively smaller passages which lead to the exit port 30 through exit passages 39 and 40 from each of the end of the device. These exit passages are of a diameter essentially the same as that of the main passageway 32, and lead to the exit passage 30, of similar capacity and diameter. The single exit port 30 opens into an exit pipe 40' of like diameter which extends lengthwise of the device through the sleeve housing 33 to the right end of the unit. Thus the inlet gas pipe 36 is that coming from the outlet of the chromatographic column 10, FIGURE I, and the exit pipe 40 is comparable to the FIGURE I vent 15 from the detector 14.

The end caps 34 and 35 of this device are secured to the housing sleeve 33 by screws on each end of the device as indicated at 41 and 42. At the left hand end of the drawing, it may be noted, for the purposes of assembly, the cap 34 is integral with the main body cylinder 31 and the assembly of the cap 34 with respect to the sleeve housing 33 is aided by a disc gasket 43 which may be of suitable rubberlike material to provide a sufficient gas seal arrangement. The right hand end of the device is of slightly different construction, again for assembly purposes, and the cap 35 is a separate unit bolted to the housing sleeve 33 with suitable gasket arrangements as at 44 and 45, again to provide a gas tight assembly.

The main gas passage 32 through the central cylindrical body 31 has a terminal enlargement at each end as at 46 and 47 from which the exit passage spokes 28 and 29 respectively carry gas to the exit pipes 39 and 40. These end passage enlargements 46 and 47 are sealed off by end mounting arrangements 48 and 49 for mounting the ends of the hot wire 21. These arrangements are unitary assemblies each comprising a metal sleeve as at 50 and 51, mounted at their inner ends in thermally nonconductive glass sleeves 52 and 53. The glass sleeves 52 and 53 are in turn mounted in metal sleeves 52' and 53' which are solder mounted about the enlarged openings 46 and 47 to seal off the ends of the main gas passage 32. The metal sleeves 48 and 49 are tapered radially inwardly at their outer ends to crimp off the gas passage and seal the hot wire therein, with the hot wire extending outwardly therefrom in each case to become part of the bridge circuit of FIGURE II. Solder is used where desirable to aid in this pinch off sealing off arrangement. In the left hand end of the device this mounting is made in the cap 34 and in the right hand end it is made in the body 31, but since 34 is integral therewith both such mountings are effectively made in the main central body 31 of the device as a solid unitary structure.

These glass sleeve hot wire end assemblies are for the purpose of maintaining at a minimum the temperature loss due to conduction, that is, through actual contact of the wire in its mounting arrangements. Thus, as will be described hereinafter, the hot wire 21 has temperature losses through conduction at its ends, with these losses, however, minimized by the special arrangement of mounting in glass sleeved metal tubes as described above. It will be seen that these mounting arrangements, although the temperature losses are decreased, do provide in the length of the hot wire, a central main area of substantial temperature constancy in so far as conduction is concerned, and it is in this uniform temperature area that the effective operation of this device is carried out with the gas entrance at the lengthwise center of the main tube 32 and the gas exits 28 and 29 located substantially inwardly of the device from the actual mounting contacts of the hot wire with the pinched outer ends of the metal tubes. It will be seen that the temperature lossy end portions of the hot wire are not part of the operatively active portion of the hot wire with which this device is concerned.

Thus the gasses being measured are passed over those portions of the wire 21 wherein there is little if any temperature loss due to conduction through mounting arrangements of the wire. Specifically in FIGURE III these areas lie between the entrance port 27 and the exit port 28 on the one hand and the exit port 29 on the other. The hot wire portions lying between the end openings 46 and 47 of the passage 32 and respectively the outer tapered ends of the metal tubes 48 and 49, are subject to temperature losses due to the conduction of heat at the points of mounting, that is the outer end portions of the metal tubes 48 and 49. However, these portions of the hot wire are not in the areas of active flow of gas and so have relatively little effect on the measurement. Thin, low thermal conductivity baffle discs 46' and 47' may be provided, with center openings for the hot wire without contact, as means for keeping gas flow or diffusion at a minimum in the tubes 48 and 49.

In order to provide leak proof connection arrangements for the gas input pipe 36 at the input port 27 and the gas output pipe 40 at the gas output port 30, the sleeve housing 33 is transversely cut away in relatively wide slot fashion as at 54 and 55. This slot arrangement may be seen in the center section view of FIGURE VI. Gas entrance and exit brackets 56 and 57 are provided transversely of the main body of the device in the slots 54 and 55 respectively, and are bolted to the sleeve housing 33 as at 58 and 59 respectively. A recess 60 is formed from the slot 54 down into the central body 31 and a passage in continuance of the pipe 36 is formed in angle fashion through the bracket 56 and down through the entrance port 27 into the main lengthwise passage 32 in the main body 31. The bracket 56 is provided with a downwardly extending central boss 61 which fits into the recess 60, and a conical O-ring 62 of suitable rubberlike material is fitted around the boss 61 and into a countersink arrangement with respect to the recess 60 as a means of sealing off the mounting arrangement between the bracket 56 and the sleeve body 33 to provide a gas-tight entrance assembly arrangement.

In like fashion the exit arrangement has a recess 63 into which an upward boss 64 from the exit bracket 57 is extended with a sealing conical O-ring 65 located thereabout and in a countersink arrangement of the recess 63. The exit port 30 is formed through the boss 64 to connect with the output pipe 40′. The recess 63 extends into the FIGURE III output passages 39 and 40 although the O-ring and exit port arrangement 30 may be made flush with the near wall of these pipes 39 and 40 if so desired.

It should be noted that diffusion volumes are at the minimum in the construction of this device. Side pockets or gas collection or trapping angles are minimized so that a cleanly washed, steadily proceeding flow of gas to be measured occurs throughout the device. This is especially important in regard to the entrance and exit ports as well as in the main portion of the actively used area of the hot wire.

Another factor in regard to the passage of gasses is the balance arrangement of the output passages in size and length to provide effectively equal distribution of back pressures in the output of the device. In some instances it may be desirable to have the gas entrance not precisely at the center of the length of the device. Thus this arrangement may be tailored to the needs of a particular application with the main feature of this device being the intermediate arrangement of an entrance, and the end arrangements of two ports to split the incoming gas and cover more of the wire with gas, in a shorter time for a given flow.

Electrical connections are provided with respect to this device by forming a lengthwise slot 66 as shown in FIGURES IV, V, and VI. The wire connecting the left hand end of the hot wire 21 may be bent around, suitably insulated, and brought up the length of the device in the slot 66 with suitable packing thereon to hold it in the slot. Electrical connections from both ends of the hot wire 21 are thus made at the FIGURE III right hand end of the device. The illustration of this arrangement is in the right end view, FIGURE V, wherein an insulation cross bar 67 is provided with electrical conducting strips 68 and 69 to which the ends of the hot wire 21 are connected as at 70 and 71. Thereafter the output leads from the device to the bridge circuit arrangement as in FIGURE II may be taken from points 72 and 73.

As a theoretical, no gas flow situation, FIGURE VII represents the temperature conditions of a wire of finite length strung between two identical end supports and carrying a current such that its temperature exceeds that of the surrounding gas and that of the supporting structure. There is in all such structures a thermal shunt to ground across which a temperature gradient exists and therefore the profile of the curve sags at either end. In this representation no gas flow is introduced and the picture is then one of thermal symmetry about a vertical axis through the center of the wire.

As a further theoretical situation, with gas flow from one end of a wire toward the other end, FIGURE VIII is a representation like that in FIGURE VII except that a flow of gas has been introduced with some value of thermal conductivity flow being introduced from the right. Thus the projected temperature profile is, upstream of the wave front, depressed below that indicated in FIGURE VII, and the right end of the curve is depressed well below the left end.

The effect of the device of this invention is illustrated, with respect to FIGURE IX, and the condition is that a flow of gas has been impinged on the center of the wire and travelled at equal rates in opposite directions along the wire from the center of the wire. In this case a wave profile is indicated with the entire center section between the wave fronts depressed. The depressed portion of the curve indicates that area of the FIGURE III hot wire 21 between the entrance port and the exit ports along the wire, that is, the effective operating range along the hot wire prior to those portions of the wire which have the thermal gradient due to their support arrangement at the ends.

The hot wire 21 of FIGURE III and its associated gas passage 32 are concentric and have quite small diameters so that small volumes of gas have substantial effects. An example of the operational conditions of this device is that the gas passage 32 may be 40 mm. in diameter and the gas sample 1/10 of a cc. so that the flow rate is 1 cc. per second. The hot wire 21 may be ½ mil. wire with large resistance and relatively small length.

This invention therefore provides a new and improved thermal conductivity gas analysis hot wire detector.

As many embodiments may be made of the above invention, and as changes may be made in the embodiment set forth above, without departing from the scope of the invention, it is to be understood that all matter hereinbefore set forth or shown in the accompanying drawings is to be interpreted as illustrative only and not in a limiting sense.

I claim:

1. A gas analysis detector comprising an elongate gas detection passage, an electrical resistance wire established lengthwise and concentric with said passage, end mountings for said wire at the ends of said passage, a gas entrance passage in the lengthwise central portion of said detection passage and a gas exit pasage adjacent each end of said detection passage for establishing unidirectional flow in each of two opposite directions along said wire, said gas exit passages being located lengthwise inwardly from said wire end mountings sufficiently to avoid most of the temperature loss effects due to conduction through said wire end mountings, and said gas passages each establishing gas flow along said wire from center entrance to end exit and together comprising a gas passage system with minimum effective diffusion volume.

2. A gas analysis detector comprising an elongate gas detection pasage, an electrical resistance wire established lengthwise and concentric with said pasage, end mountings for said wire at the ends of said pasage, a gas entrance passage midway lengthwise of said passage, and a gas exit passage adjacent each end of said detection passage for establishing unidirectional flow in each of two opposite directions along said wire, said gas exit passages being located inwardly along said wire from said end mountings sufficiently to avoid most of the temperature loss effects due to conduction through said wire end mountings, said gas passages each establishing gas flow along said wire from center entrance to end exit and together comprising a gas passage system with minimum effective diffusion volume, and said wire end mountings including means tending to oppose said temperature conduction losses.

References Cited in the file of this patent

UNITED STATES PATENTS

| | | |
|---|---|---|
| 2,821,462 | McEvoy | Jan. 28, 1958 |
| 2,833,629 | Carbonara et al. | May 6, 1958 |
| 2,926,520 | Schmauch | Mar. 1, 1960 |